United States Patent
Schnoor et al.

(10) Patent No.: US 11,494,814 B2
(45) Date of Patent: Nov. 8, 2022

(54) PREDICTIVE MODELING TECHNIQUES FOR GENERATING RATINGS FORECASTS

(71) Applicant: Disney Enterprises, Inc., Burbank, CA (US)

(72) Inventors: Dustin A. Schnoor, Winter Garden, FL (US); David T. Parker, Orlando, FL (US); Thomas W. Denslow, Winter Garden, FL (US); John B. Ruddy, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 417 days.

(21) Appl. No.: 15/687,394

(22) Filed: Aug. 25, 2017

(65) Prior Publication Data

US 2019/0066170 A1    Feb. 28, 2019

(51) Int. Cl.
  *G06Q 30/02*  (2012.01)
  *G06N 5/02*  (2006.01)
  *G06N 20/00*  (2019.01)
  *G06N 20/20*  (2019.01)

(52) U.S. Cl.
  CPC ......... *G06Q 30/0282* (2013.01); *G06N 5/022* (2013.01); *G06N 20/00* (2019.01); *G06N 20/20* (2019.01)

(58) Field of Classification Search
  CPC combination set(s) only.
  See application file for complete search history.

(56) References Cited

U.S. PATENT DOCUMENTS

| | | | |
|---|---|---|---|
| 10,708,654 B1 * | 7/2020 | Moraghan | H04N 21/2547 |
| 2009/0150224 A1 * | 6/2009 | Lu | G06Q 30/0202 |
| | | | 705/7.29 |
| 2015/0189351 A1 * | 7/2015 | Kitts | G06Q 10/067 |
| | | | 725/19 |
| 2015/0271540 A1 * | 9/2015 | Melby | H04N 21/2668 |
| | | | 725/34 |
| 2017/0024770 A1 * | 1/2017 | Abdulkader | G06Q 30/0277 |
| 2017/0024788 A1 | 1/2017 | Denslow, III et al. | |
| 2017/0026678 A1 * | 1/2017 | Smith | H04N 21/482 |
| 2017/0161772 A1 * | 6/2017 | Xu | G06F 16/2455 |
| 2018/0336577 A1 * | 11/2018 | Radcliffe | G06N 20/00 |

* cited by examiner

*Primary Examiner* — Chrystina E Zelaskiewicz
(74) *Attorney, Agent, or Firm* — Artegis Law Group, LLP

(57) ABSTRACT

A technique for predictive modeling to generate ratings forecasts in a media network is described. An episode-level programming schedule is imported into a viewership forecasting application to generate episode-level ratings predictions. Episode-level ratings predictions for media content in the episode-level programming schedule are generated by implementing multiple different predictive algorithms in parallel for each instance of specific media content in the programming schedule. In addition, for each such predicted viewership value, an accuracy value is generated that indicates the likely accuracy of that predicted viewership value. The episode-level ratings predictions can be uploaded by a business unit of the media network, and merged with a programming schedule currently employed by the business unit.

21 Claims, 5 Drawing Sheets

PREDICTIVE MODELING TECHNIQUES FOR GENERATING RATINGS FORECASTS

BACKGROUND OF THE INVENTION

Field of the Invention

The present disclosure relates generally to computer science and forecasting techniques, and, more specifically, to predictive modeling techniques for generating ratings forecasts.

Description of the Related Art

As digital and mobile communications have become ubiquitous, the consumption environment for media content has become increasingly complex. Thus, there are now many options for end users to enjoy media content besides the traditional watching broadcast television (TV) and watching movies in-theater. For example, end users can now stream free and subscription content to televisions or mobile devices, rent DVDs, purchase pay-per-view rights to specific digital content, and so on. Accordingly, producers and publishers of media content can now offer to potential customers, such as advertisers, many new advertising opportunities.

To effectively leverage the diverse advertising products that are now available to advertisers, media content providers need to quantifiably demonstrate to potential advertisers that a particular instance of content is an effective vehicle for marketing the goods or services of those advertisers. In that regard, the predicted viewership for a particular instance of media content, such as a particular TV presentation, can enable a media content provider to successfully market advertising time associated with that instance of media content. Thus, accurately predicting the expected viewership of TV shows and other instances of media content is central to generating robust revenue models for a media content provider.

Unfortunately, due to the scale and fluidity inherent in scheduling the air times and streaming availability times for media content, the content scheduling process for even a single media content provider can be very complex and provide less-than-optimal output. As a result, accurately predicting the expected viewership of the many instances of media content in a programming schedule is difficult, if not impossible. First, matching content from the thousands of available movie titles and series episodes to appropriate air times is a largely manual and time-consuming process, and is generally only completed periodically, such as once every two weeks. Thus, the most up-to-date scheduling information available for marketing activities and financial analysis is generally only refreshed periodically. Second, such schedules rarely extend with much accuracy into the future for more than a few weeks, and necessarily include non-specific entries as place-holders, such as a genre type and air time duration. As a result, predicting accurate viewership for specific time slots based on such high-level or simplistic content descriptions is problematic at best, and can be a barrier to effective marketing and accurate revenue projections.

Further, even when a detailed programming schedule is available, accurately predicting the expected viewership for each instance of media content in the programming schedule is a highly variable and unreliable process. Some attempts have been made to apply predictive modeling algorithms to this problem. However, factors such as the large number of different types and genres of media content as well as the many options by which end users can view such content make conventional predictive modeling algorithms unreliable. Among other things, there is no accurate way to determine which algorithm is best-suited for predicting viewership of a particular instance of media content.

As the foregoing illustrates, what is needed in the art are more effective techniques for forecasting viewership for scheduled media content.

SUMMARY

One embodiment of the present invention sets forth a technique for generating a predicted viewership for an instance of media content included in a programming schedule. The technique includes generating, via a first predictive modeling algorithm, a first predicted viewership value for a future showing of a first instance of media content; generating, via the first predictive modeling algorithm, a second predicted viewership value for a past showing of a second instance of media content that shares at least one programming attribute with the first instance of media content; and calculating a first accuracy value for the first predicted viewership value based on a comparison of the first predicted viewership value and the second predicted viewership value. The technique further includes generating, via a second predictive modeling algorithm, a third predicted viewership value for the future showing of the first instance of media content; generating, via the second predictive modeling algorithm, a fourth predicted viewership value for a past showing of a third instance of media content that shares at least one programming attribute with the first instance of media content; calculating a second accuracy value for the third predicted viewership value based on a comparison of the third predicted viewership value and the fourth predicted viewership value; and selecting either the first predicted viewership value or the third viewership value as a recommended predicted viewership value for the future showing of the first instance of media content based on the first accuracy value and the second accuracy value.

At least one advantage of the disclosed techniques is that they provide a highly granular inventory forecast for a media network. The detailed viewership predictions included in such an inventory forecast enables more accurate revenue projections and expected viewership predictions for an entire programming schedule or for selected portions thereof. Another advantage is that various users within the media network, including scheduling and researcher users, financial analysts, and marketing or sales personnel can modify the most up-to-date inventory forecast based on various hypothetical changes to optimize future versions of the programming schedule. A further advantage is that a plurality of different predictive modeling algorithms can be employed to generate predicted viewership values for a large number of different instances of media content, where, the output of the most accurate algorithm can be determined and used for each instance of media content.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be con

For clarity, identical reference numbers have been used, where applicable, to designate identical elements that are common between figures. It is contemplated that features of one example aspect may be incorporated in other example aspects without further recitation.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
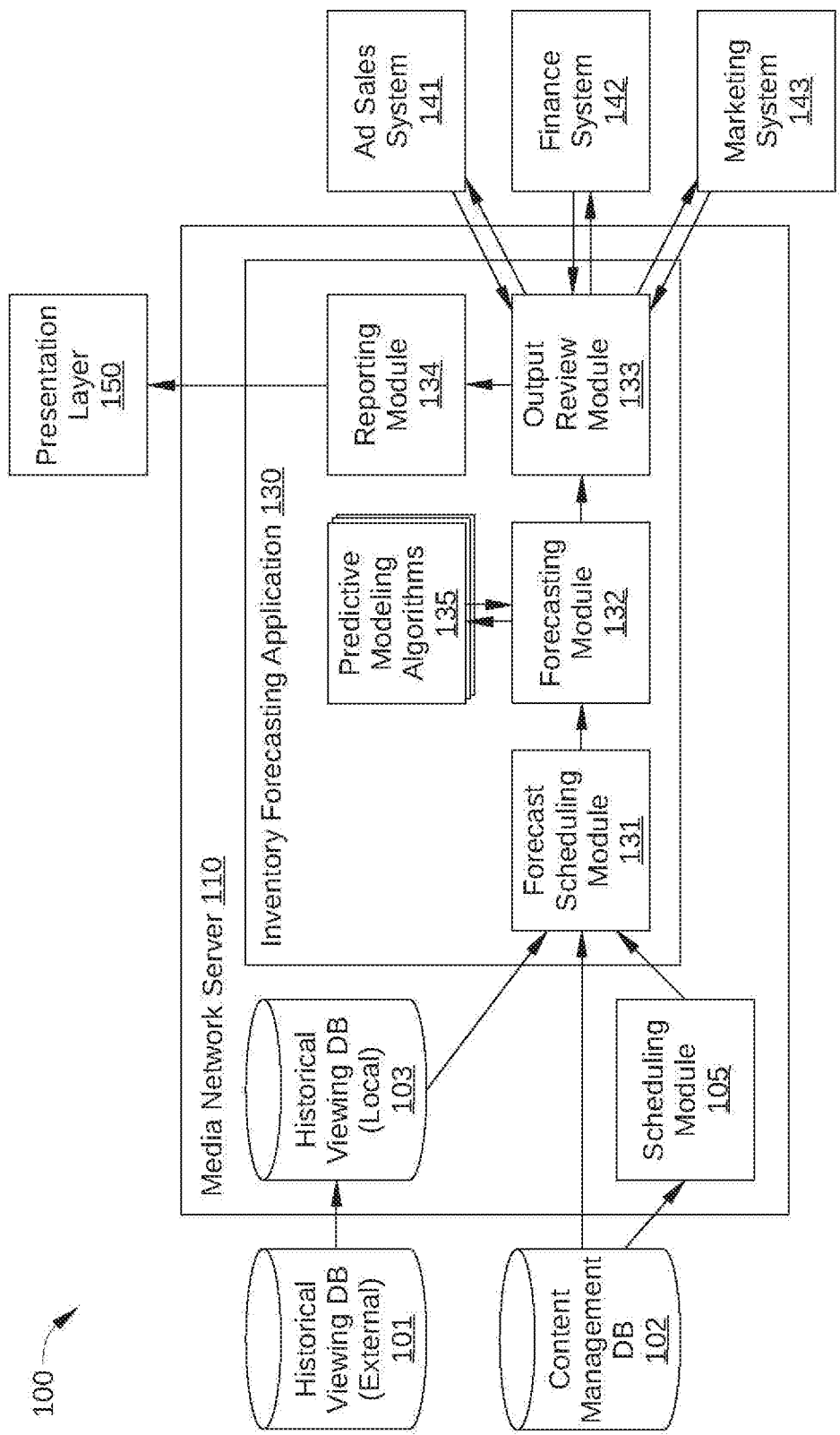
- FIG. 1 illustrates a block diagram of a forecasting system configured to implement one or more aspects of the present invention.

FIG. 1 illustrates a block diagram of a forecasting system 100 configured to implement one or more aspects of the present invention. Forecasting system 100 is an analytics platform that connects various departments or entities within a media content provider to facilitate financial planning, content scheduling, and optimization of ratings-based revenue. To that end, 100 includes a historical viewing database 101, a content management database 102, a media network server 110, a sales system 141, a finance system 142, a marketing system 143, and a presentation layer 150.

Historical viewing database 101 includes one or more databases communicatively connected to media network server 110. Historical viewing database 101 represents one or more third-party data sources of historical viewing data such as measured viewership for hundreds or thousands of individual instances of broadcast media content, such as movies, individual television (TV) shows episodes, sporting events, and the like. For example, historical viewing database 101 may include Nielson data for some or all such instances of broadcast media content, such as Nielsen Television Index (NTI) data, Nielsen AMRLD (All-Minute Respondent Level Data), and the like. In some embodiments, such data may include gender, demographic, and regional breakdowns of viewership for each telecast or instance of broadcast media content.

Content management database 102 is a database that is communicatively connected to media network server 110. Content management database 102 includes content rights data indicating what media content is available to be aired by a media network associated with 100. Alternatively or additionally, content management database 102 includes historically aired content data. In such embodiments, content management database 102 further includes one or more attributes or other metadata for some or all media content entries, such as genre type, target demographic, what media content aired immediately before as a lead-in, the seasonality of the airing, and/or any other attributes that may have affected viewership.

Historical viewing database 103 is another database that is communicatively connected to media network server 110. Historical viewing database 103 is a local database that includes similar historical viewing data to that available in historical viewing database 101, and stores such data locally in media network server 110. In some embodiments, the historical viewing data in historical viewing database 103 may include one or more attributes or other metadata for some or all media content entries, such as genre type, target demographic, what media content aired immediately before as a lead-in, the seasonality of the airing, and/or any other attributes that may have affected viewership.

Media network server 110 may be implemented as a computing device or a plurality of communicatively connected computing devices. In some embodiments, media network server 110 is communicatively connected to a network (not shown), which may be any technically feasible type of communications network that allows data to be exchanged between media network server 110 and external entities or computing devices (not shown). For example, the network may include a wide area network (WAN), a local area network (LAN), a wireless (WiFi) network, and/or the Internet, among others.

As shown, media network server 110 includes historical viewing database 103 (described above), a scheduling module 105, an inventory forecasting application 130, and a presentation layer 150, and is communicatively connected to sales system 141, finance system 142, and marketing system 143.

Scheduling module 105 enables a user to generate a detailed programming schedule for the media network associated with 100, such as a programming schedule that reflects a full fiscal year plan of the date and time that every telecast will originally air and repeat. More specifically, scheduling module 105 generates a particular programming schedule based on user inputs and on content rights data from content management database 102. In addition, scheduling module 105 is configured to input generated programming schedules to a forecasting module 131 of inventory forecasting application 130.

The programming schedule generated by scheduling module 105 can include airing times of specific media content over a certain time period, such as the next two weeks or months. Alternatively or additionally, the time period can be an extended time period, for example for a fiscal quarter, or longer. For example, in some embodiments, scheduling module 105 is configured to generate a detailed programming schedule that sets forth airing times of specific media content for the next one or more years. Alternatively or additionally, in some embodiments, the programming schedule generated by scheduling module 105 includes availability windows for specific media content that is accessed via streaming, pay-per-view, and/or subscription-based services. That is, media content accessed via streaming, pay-per-view, and/or subscription-based services generally does not have a specific broadcast time, and instead is accessible to certain end users over a predefined time period, such as any time within a specific calendar month, any time within three days of downloading the media content, etc.

In some embodiments, each instance of specific media content included in a programming schedule generated by scheduling module 105 is a specific movie, TV show episode, sporting event, or other specific programming content. Alternatively or additionally, in some embodiments, some or all of the media content included in a programming schedule generated by scheduling module 105 can be proposed programming content rather than actual programming content. For example, in such embodiments, one or more entries in a programming schedule generated by schedule module 105 may be indicate that the programming content scheduled for a particular airing time belongs to a specific genre of entertainment, such as "crime drama," "reality show," and the like.

Inventory forecasting application 130 is an analytical software tool that enables information sharing at a highly granular level between multiple departments or other business units within a media network including, for example, sales system 141, finance system 142, and/or marketing system 143. More specifically, inventory forecasting application 130 enables the creation of one or more versions of a detailed programming schedule, the generation of viewership forecasts for each such programming schedule version, the sharing of one or more of these viewership forecasts with various business units of a media network, and modification of shared viewership forecasts with feedback input from any of the various business units.

Inventory forecasting application 130 generates a viewership forecast for a particular version of a programming schedule by implementing multiple different predictive algorithms in parallel for each instance of specific media content in the programming schedule. Thus, inventory forecasting application 130 generates multiple predicted viewership values for each instance of specific media content in the programming schedule. In addition, for each such predicted viewership value, inventory forecasting application 130 generates a score, or "accuracy value," that indicates the likely accuracy of that predicted viewership value. Based on these accuracy values, inventory forecasting application 130 recommends a single predicted viewership value for each instance of specific media content in the programming schedule in the programming schedule. Thus, of the plurality of predictive algorithms available for use, the single recommended viewership value for each instance of specific media content is generated with the a predictive algorithm determined to be the most accurate, or one of the most accurate, for the specific instance of media content, To that end, inventory forecasting application 130 includes, in some embodiments, one or more of a forecast scheduling module 131, a viewership forecasting module 132, an output review module 133, a reporting module 134, and one or more predictive modeling algorithms 135.

Inventory forecasting application 130 can create a programming schedule with forecast scheduling module 131 and/or import a specific programming schedule into forecast scheduling module 131 from scheduling module 105. For example, a user associated with a programming group in a media network can generate, via scheduling module 105, an episode-level programming schedule for a particular time frame, such as for the next month. Inventory forecasting application 130 can then import that episode-level programming schedule for analysis and subsequent sharing, as set forth below. Alternatively or additionally, in some embodiments, inventory forecasting application 130 can create or modify an episode-level programming schedule via forecast scheduling module 131. In such embodiments, forecast scheduling module 131 can include similar functionality to scheduling module 105, including schedule editing and series creation capability. Forecast scheduling module 131 may further include a tracking system for tracking the various modified versions of a programming schedule received from scheduling module 105 that may be created. Thus, forecast scheduling module 131 enables a research user to modify a current programming schedule on a highly granular level, i.e., on an episode or telecast level, thereby facilitating downstream research functions such as quantifying predicted viewership of individual telecasts, optimizing ratings of individual telecasts, optimizing the combined ratings of multiple telecasts, quantifying the impact of series cancellations, and the like.

Inventory forecasting application 130 generates episode-level viewership forecasts with viewership forecasting module 132. Viewership forecasting module 132 is capable of generating predicted viewership for each telecast or other instance of specific media content included in a particular programming schedule. For example, in some embodiments viewership forecasting module 132 generates predicted viewership based on a programming schedule input from scheduling module 105. Additionally or alternatively, in some embodiments, viewership forecasting module 132 generates predicted viewership based on a version of such a programming schedule generated by forecast scheduling module 131.

Viewership forecasting module 132 generates episode-level viewership forecasts based on inputs from a research user and on specific episode-level programming schedule. User inputs can include parameters defining the scope of the forecast, such as what type of ratings are to be forecast, for which telecasts or other specific instances of media content is the forecast is to be performed, which demographic ranges are to be reported, and/or which predictive algorithms 135 are to be employed in the forecasting analysis. Rating types that may be employed include average commercial minutes in live programming, average commercial minutes in live programming plus total playback by digital video recorder out to three days later (also referred to as "C3 ratings"), average commercial minutes in live programming plus total playback by digital video recorder out to seven days later (also referred to as "C7 ratings"), among others. Demographic types to be reported may include one or more demographic categories broken down along various factors, such as age, gender, race, economic class, whole household, and region.

As noted above, a research user can select one or more of predictive algorithms 135 to generate a viewership forecast for one or more specific instances of media content included in a particular episode-level programming schedule. The predictive algorithms 135 that are selected by a research user to generate a viewership forecast may include finance models, standard statistical modeling techniques, and machine-learning-based algorithms.

Finance models included in predictive algorithms 135 include average-based models that create an average of different indices for a particular instance of media content derived from historical performance of that particular media content. In some embodiments, such average-based models may be employed as a "first run" during the forecasting process to generate a baseline viewership forecast via a less complex, historical-data-based algorithm. In some embodiments, one or more such average-based models include a year-over-year decline calculation for instances of media content that have aired for more than one year. For example, a year-over-year percentage difference in actual viewership for such an instance of media content is employed to generate a predicted viewership for that instance of media content in the current year. Alternatively or additionally, in some embodiments, one or more such average-based models include a calculation for a new season average of a particular instance of media content that is based on actual viewership of the N most recently aired episodes of the particular instance of media content. In such embodiments, the calculation for the new season average of the particular instance of media content may include a seasonal trend factor derived from the N most recently aired episodes.

Statistical modeling algorithms included in predictive algorithms 135 generally include regression-based and time-series-based algorithms. More specifically, such statistical modeling algorithms generate a viewership forecast based on statistical attribution data for each telecast or other instance of specific media content included in a particular programming schedule. For example, in some embodiments, such attribution data for a specific instance of media content, such as a particular episode of a TV series, can include one or more of genre, type of show, whether the media content is historically a higher or lower performer, what day and time the specific media content previously aired, whether the media content was aired as a back-to-back episode, what media content was the lead-in and/or lead-out, etc. Thus, rather than employing historical performance data, statistical modeling algorithms can generate a viewership forecast based on one or more attributes of a particular instance of media content.

Machine-learning-based algorithms included in predictive algorithms 135 may employ clustering-based regression techniques, and can include some form of segmentation in addition to regression. Such machine-learning-based algorithms can generate a viewership forecast for a particular instance of media content based on the historical viewership of related media content that are in some way similar to the particular instance of media content of interest. For example, such related media content may include media content that shares more than a single attribute or attributes (such as genre, timeslot, etc.) with the particular instance of media content of interest. Alternatively or additionally, such machine-learning-based algorithms can generate a viewership forecast based on general trends in evidence across multiple instances of related media content. Thus, historical information associated with a large number of different but related shows and telecasts can be employed in generating a viewership forecast for the particular instance of media content of interest.

In addition, by applying segmentation methods to historical viewership data over a large number of telecasts, the machine-learning-based algorithms included in predictive algorithms 135 can isolate unobserved factors to produce a viewership forecast. That is, the machine-learning-based algorithms included in predictive algorithms 135 can detect and include factors that have a real-world impact on viewership of a particular instance of media content, but are not directly identified as an attribute of that particular instance of media content. For example, in some embodiments, one or more machine-learning-based algorithms included in predictive algorithms 135 may define related media content to include any or all media content that shares such an unobserved factor with the particular instance of media content, such as having a special guest star, having a football game as a lead-in, etc. Thus, historical trends, special events, and other factors known to have an effect on ratings can be included in a viewership forecast, even when such factors are not specifically indicated to be an attribute for the particular instance of media content of interest. Further, ratings anomalies, such as the effects of a breaking new event, can be somewhat filtered from historical viewership data.

In some embodiments, one or more machine-learning-based algorithms included in predictive algorithms 135 are part of a multi-stage model, where the inputs to the machine-learning-based algorithms include outputs from the above-described statistical modeling algorithms. Alternatively or additionally, a research user can select an additional predictive algorithm 135 to generate a viewership forecast, based on the output of one or more completed runs of other predictive algorithms 135.

It is noted that inventory forecasting application 130 enables predicted viewership analysis to be performed on a plurality of versions of a given programming schedule, thereby enabling a research user to select a version that optimizes or otherwise increases ratings and/or revenue for a particular show, a particular timeslot, a group of timeslots (such as an entire day or week), or the entire media network.

Output review module 133 facilitates sharing of forecasts generated by inventory forecasting application 130 with other business units within a media network, such as ad sales system 141, finance system 142, and/or marketing system 143. In some embodiments, output review module 133 pushes or uploads viewership forecasts completed by viewership forecasting module 132 to one or more of ad sales system 141, finance system 142, and/or marketing system 143. Alternatively or additionally, output review module 133 is configured to receive input from a user in a business unit so that output to that business is tailored to the needs of that business unit. In some embodiments, output review module 133 can receive input from a sales user and modify the content of a viewership forecast transmitted to ad sales system 141. For example, the ad sales user can input, via review module 133, an indicator for which weeks of the forecast should include aggregate ratings instead of episode-level ratings, an indicator that predicted ratings should be organized by show, an indicator that predicted ratings should be organized by timeslot, etc. Output review module 133 can enable similar interactions between inventory forecasting application 130 and finance system 142 or marketing system 143. Thus, review module 133 facilitates changes to a programming schedule to be quickly reflected in the versions of the most up-to-date programming schedule employed by downstream systems in a media network, such as ad sales system 141, finance system 142, and/or marketing system 143.

Reporting Module 134 is a software tool for generating high-level output for digestion by users who are not authorized to modify viewership forecasts generated by inventory forecasting application 130. For example, rather than outputting a viewership forecast as an image file, such as a pdf file, or as a spreadsheet, reporting module 134 provides a software interface for some users with viewership forecasts. For instance, reporting module 134 may provide presentation layer 150, which can include a dashboard or other user interface for presenting a viewership forecast generated by inventory forecasting application 130.

Ad sales system 141 represents one or more computing devices associated with an advertising sales business unit of a media network. Thus, via ad sales system 141, sales personnel can receive viewership forecasts from inventory forecasting application 130 and, in some embodiments, provide input to inventory forecasting application 130. Finance system 142 represents one or more computing devices associated with a finance business unit of a media network. Thus, via finance system 142, finance personnel can receive viewership forecasts from inventory forecasting application 130 and, in some embodiments, provide input to inventory forecasting application 130. Marketing system 143 represents one or more computing devices associated with a marketing business unit of a media network. Thus, via marketing system 142, marketing personnel can receive viewership forecasts from inventory forecasting application 130 and, in some embodiments, provide input to inventory forecasting application 130.

Figure 2:
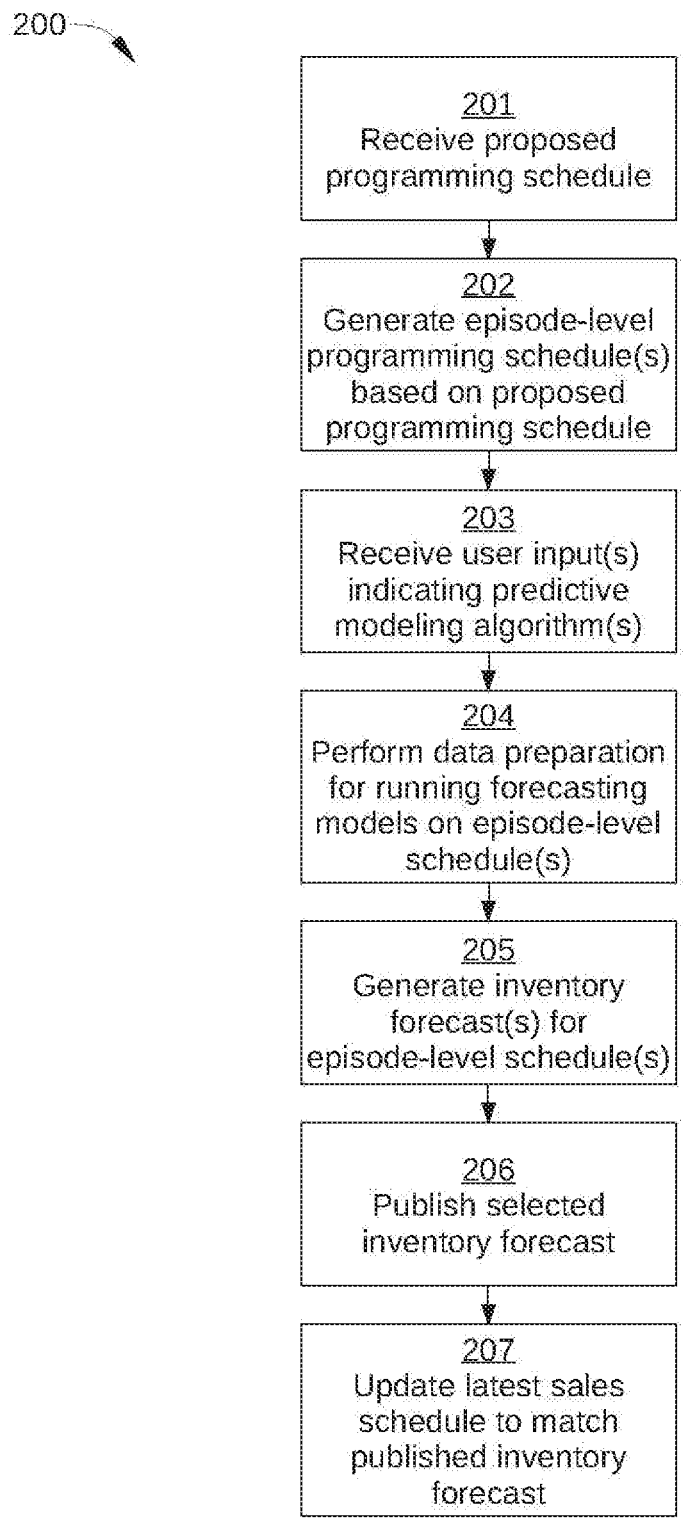
FIG. 2 is a flowchart of method steps for generating an episode-level inventory forecast for a media network programming schedule, according to various embodiments of the present invention.

FIG. 2 is a flowchart of method steps for generating an episode-level inventory forecast for a media network programming schedule, according to various embodiments of the present invention. Although the method steps are described with respect to forecasting system 100 of FIG. 1, persons skilled in the art will understand that the method steps may be also performed with other computing systems without exceeding the scope of the invention.

As shown, a method 200 begins at step 201, where forecast scheduling module 131 receives a proposed programming schedule from scheduling module 105. The proposed programming schedule is an episode-level or telecast-level programming schedule, and can include programming for an extended period of time, such as one or two years. In some embodiments, a portion of the individual instances of broadcast media content are not specific episodes, movies, or other specific programming content, and instead are generic programming descriptions. In some embodiments, forecast scheduling module 131 also receives data from content management database 102 and/or historical viewing database 103. For example, a research user employing forecast scheduling module 131 may receive such data in order to subsequently implement changes to the proposed programming schedule received from scheduling module 105, i.e., to generate different versions of the proposed programming schedule.

In step 202, forecast scheduling module 131 generates one or more episode-level programming schedules on which to run viewership forecasting models, referred to herein as predictive modeling algorithms 135. The one or more episode-level programming schedules are based on the proposed programming schedule received in step 201. For example, forecast scheduling module 131 generates one or more different versions of the proposed programming schedule received in step 201. Thus, when a viewership forecast is run for each version, the effect on ratings of the different schedule modifications made to the proposed programming schedule can be quantified. In some embodiments, changes to the proposed programming schedule are based on data received from content management database 102, historical viewing database 103, user inputs, and/or other sources.

In optional step 203, viewership forecasting module 132 receives one or more user inputs indicating one or more of predictive modeling algorithms 135 to be employed when generating a viewership forecast for the one or more versions of the proposed programming schedule generated in step 202.

In step 204, viewership forecasting module 132 performs data preparation for subsequently running predictive modeling algorithms 135 on the one or more versions of the proposed programming schedule generated in step 202. Such data preparation may include the incorporation of Nielsen data (for example from historical viewing database 103); internal network metadata; genre metadata and mapping tables, internal scheduling information (when applicable), such as lead in/out information for certain instances of media content; prior year mappings; episode, show, and movie name metadata and mapping tables; competitive programming schedules (when available); and various calendars, such as a sales-system-defined calendar, a financial calendar, and/or a Nielson broadcast calendar.

In step 205, viewership forecasting module 132 generates an inventory forecast for the one or more versions of the proposed programming schedule by running one or more predictive modeling algorithms 135. In some embodiments, the predictive modeling algorithms 135 employed in step 205 are those indicated via user input in step 203. In other embodiments, the predictive modeling algorithms 135 employed in step 205 are selected and performed without user input. The inventory forecast for each version of the proposed programming schedule can include a particular instance of media content for each potential air data and time for a specific time frame, such as the next fiscal quarter, calendar year, etc. In addition, for each such instance of media content, the inventory forecast includes one or more predicted viewership values. Furthermore, such predicted viewership values include an accuracy value indicating the historical accuracy of the predictive modeling algorithm 135 with respect to the particular instance of media content. In such embodiments, the accuracy value is based on historical ratings information. Embodiments for generating such predicted viewership values and associated accuracy values, which together make up the inventory forecast for a specific version of the proposed programming schedule, are described below in conjunction with FIG. 3.

Figure 3:
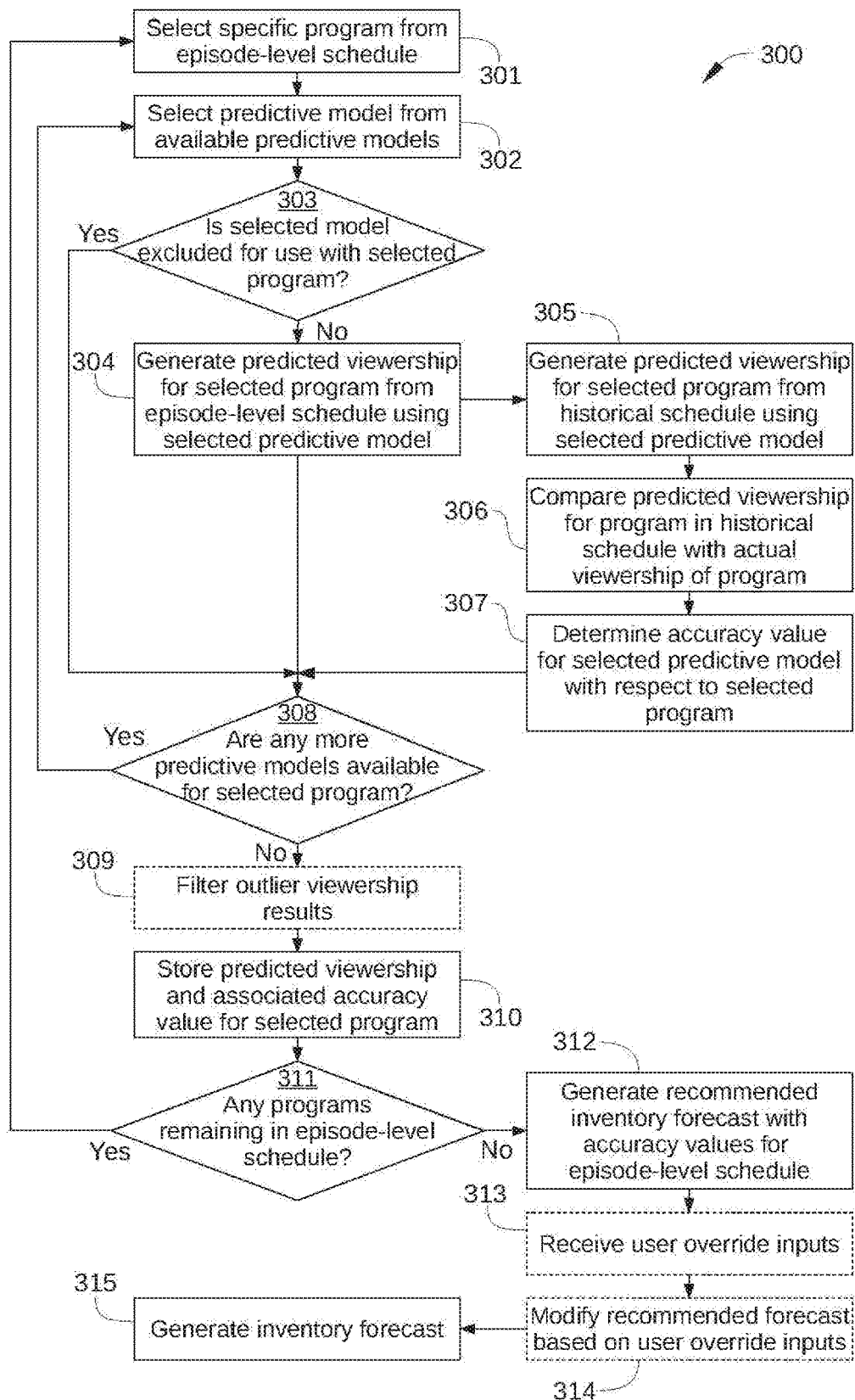
FIG. 3 is a flowchart of method steps for generating a predicted viewership value and an associated accuracy value for each program in an episode-level programming schedule, according to various embodiments of the present invention.

FIG. 3 is a flowchart of method steps for generating a predicted viewership value and an associated accuracy value for each program in an episode-level programming schedule, according to various embodiments of the present invention. Although the method steps are described with respect to forecasting system 100 of FIGS. 1 and 2, persons skilled in the art will understand that the method steps may also be performed with other computing systems without exceeding the scope of the invention.

Prior to when the method steps of FIG. 3 are implemented, output review module 133 receives, from viewership forecasting module 132, a specific episode-level schedule, i.e., a particular version of the proposed programming schedule received in step 201. In addition, forecasting module 132 receives, from forecast scheduling module 131 and/or historical viewing database 103, historical viewing data, such Nielsen data that provide average audience impressions for non-overlapping, demographic-level audience blocks.

As shown, a method 300 begins at step 301, where forecasting module 132 selects a specific program from the specific episode-level schedule for which method 300 is being performed.

In step 302, forecasting module 132 selects a predictive modeling algorithm 135 from those available in inventory forecasting application 130.

In step 303, forecasting module 132 determines whether the selected predictive modeling algorithm 135 is excluded for use with the selected program. If yes, method 300 proceeds to step 308; if no, method 300 proceeds to step 304. In some embodiments, forecasting module 132 consults business rules or other predetermined logic that indicates when a specific predictive modeling algorithm 135 is not to be employed for a particular show or category of show. For example, a statistical model that generates a predicted viewership of a program based on the last N episodes of that program that have been aired is generally a poor predictor of once-per-year special programs. Thus, for a Christmas special program, such a statistical model can be indicated to be not applicable, and is excluded for use with the Christmas special program. Alternative or additionally, user inputs, such as those received in step 203, may indicate that a certain predictive modeling algorithm 135 is not to be employed for the selected program.

In step 304, forecasting module 132 generates a predicted viewership for the selected program when aired as indicated in the episode-level schedule. Specifically, forecasting module 132 employs the predictive modeling algorithm 135 selected in step 302.

In step 305, forecasting module 132 generates a predicted viewership for the selected program when aired in a historical schedule timeslot, i.e., in one or more previous airings of a different episode of the selected program and/or of programs that are similar to the selected program and have already aired as part of a historical schedule. Thus, a predicted viewership for the selected program is determined, assuming that the selected program is aired in one or more historical airing time slots. In step 305, forecasting module 132 employs the same predictive modeling algorithm 135 as that employed in step 304.

In step 306, forecasting module 132 compares the predicted viewership generated in step 305 with historical viewing data, such as that received from content management database 102, historical viewing database 103, or forecast scheduling module 131. Thus, forecasting module 132 determines the accuracy of the currently selected predictive modeling algorithm 135, based on actual viewership of one or more previous episodes of the currently selected show and/or on the actual viewership of one or more programs similar to the selected show.

In step 307, forecasting module 132 determines an accuracy value for the selected predictive modeling algorithm 135, based on the comparison performed in step 306.

In step 308, forecasting module 132 determines whether there are any more predictive modeling algorithms 135 available for the selected program. If yes, method 300 proceeds back to step 302; if no, method 300 proceeds to step 309.

In optional step 309, forecasting module 132 filters outlier viewership results, based on the predicted viewership generated by each predictive modeling algorithm 135 for the selected program. For example, when the predicted viewership generated by one particular predictive modeling algorithm 135 varies significantly from an average predicted viewership that is based on the predicted viewership generated by some or all available predictive modeling algorithms 135, that particular predictive modeling algorithm 135 can be excluded from use for the selected program. Thus, in such embodiments, when the predicted viewership generated by a particular predictive modeling algorithm 135 varies by more than a predetermined threshold, no predicted viewership is generated with that particular predictive modeling algorithm 135 for the selected program.

In step 310, forecasting module 132 stores all predicted viewership values generated for the selected program. In addition, forecasting module 132 stores an accuracy value for each predicted viewership value, for future reference by a user.

In step 311, forecasting module 132 determines whether there are any further programs in the episode-level schedule for which a predicted viewership has not been generated. If yes, method 300 proceeds back to step 301; if no, method 300 proceeds to step 312.

In step 312, forecasting module 132 generates a recommended inventory forecast for the episode-level schedule. For example, in some embodiments, the recommended inventory forecast includes, for some or all entries in the episode-level schedule, a predicted viewership, the predictive modeling algorithm 135 employed to generate the predicted viewership, and an accuracy value associated with that predictive modeling algorithm 135. In some embodiments, the recommend inventor forecast further includes, for some or all entries in the episode-level schedule, a predicted viewership generated by other predictive modeling algorithms 135, for user reference.

In optional step 313, forecasting module 132 receives one or more user override inputs, in which a specific entry in the recommended inventory forecast is modified. For example, a user override input may indicate that the predicted viewership for a specific program in the episode-level schedule should be discarded, and the next-most-accurate predicted viewership should be included in the inventory forecast. Alternatively or additionally, a user override input may indicate which specific predicted viewership for a specific program in the episode-level schedule should be employed.

In optional step 314, forecasting module 132 modifies the recommended inventory forecast based on the user override inputs received in step 313.

In step 315, forecasting module 132 generates an inventory forecast based on the predicted viewership determined for each entry in the episode-level schedule as set forth above.

In some embodiments, the predicted viewership values for a specific instance of media content can include multiple non-overlapping Nielsen demographic block segments (e.g., female aged 18-21, 22-25, 26-30, etc.) for the C3 ratings stream. Alternatively or additionally, the predicted viewership values for a specific instance of media content can include one or more aggregated demographic segments that can include some of the non-overlapping demographic block segments (e.g., adult aged 18-49). Alternatively or additionally, the predicted viewership values for a specific instance of media content can include demographic segments that are multiplied by certain indices for compatibility with other ratings streams.

Returning now to FIG. 2, in step 206, output review module 133 publishes one or more of the inventory forecasts generated in step 205. That is, output review module 133 transmits one or more of the inventory forecasts to ad sales system 141, finance system 142, and/or marketing system 143. Alternatively or additionally, output review module 133 makes the inventory forecasts available for viewing by non-interactive users via presentation layer 150. In some embodiments, output review module 133 publishes a single inventory forecast of the multiple inventory forecasts generated in step 205. In such embodiments, the single inventory forecast may be selected by output review module 133 based on quantifiable criteria, such as maximum aggregate ratings for one or more telecasts. Alternatively, in such embodiments, the single inventory forecast may be a user-selected inventory forecast.

In step 207, output review module 133 updates the latest sales schedule to match the published inventory forecast. That is, the most recent sales schedule currently in use by ad sales system 141 is modified with changes that have been introduced by scheduling module 105 and/or forecast scheduling module 131. It is noted that the number of episode-level entries included in a typical sales programming schedule can include hundreds or thousands of individual instances of episode-level entries. Consequently, revising or otherwise updating such a programming schedule in light of changes made as part of an optimized inventory forecast can be time-consuming and error prone. According to various embodiments of the present invention, output review module 133 is configured to revise a current sales programming schedule, received from ad sales system 141, with changes to be implemented based on a particular research programming schedule. In such embodiments, the research programming schedule includes changes to the current sales programming schedule that are indicated by an inventory forecast (generated by viewership forecasting module 132) to optimize or otherwise increase ratings and/or revenue. One such embodiment is illustrated in FIG. 4.

Figure 4:
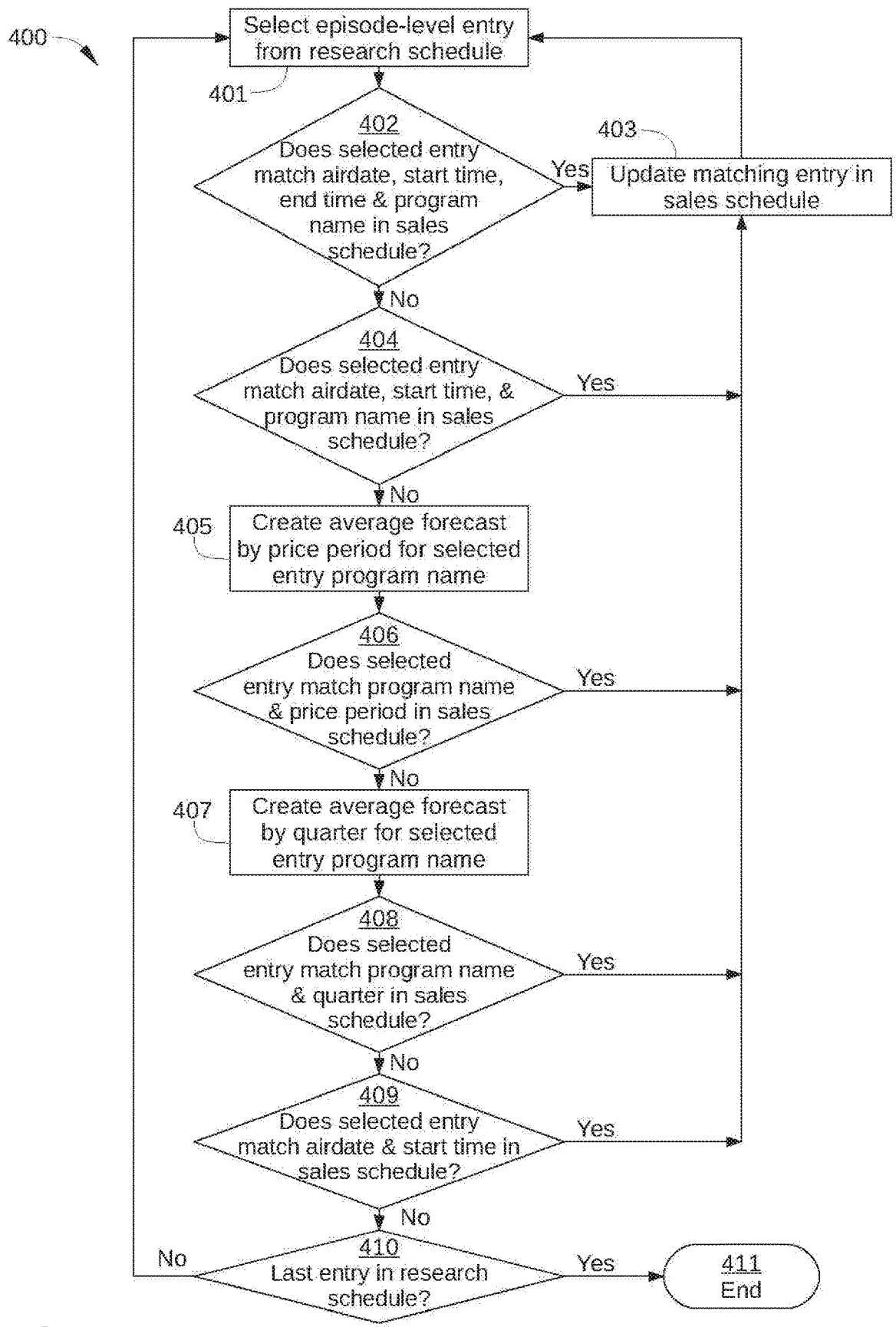
FIG. 4 is a flowchart of method steps for generating an episode-level inventory forecast for a media network programming schedule, according to various embodiments of the present invention.

FIG. 4 is a flowchart of method steps for updating an episode-level programming schedule with entries from an updated programming schedule, according to various embodiments of the present invention. Although the method steps are described with respect to forecasting system 100 of FIGS. 1 and 2, persons skilled in the art will understand that the method steps may also be performed with other computing systems without exceeding the scope of the invention.

Prior to when the method steps of FIG. 4 are implemented, output review module 133 receives, from viewership forecasting module 132, a research schedule, i.e., a programming schedule that has been revised in light of one or more inventory forecasts generated by viewership forecasting module 132. In addition, output review module 133 receives, from ad sales system 141, an ad sales schedule, i.e., a programming schedule that reflects what is currently employed by ad sales system 141 to sell advertising time.

As shown, a method 400 begins at step 401, where output review module 133 selects an episode-level entry from the research schedule.

In step 402, output review module 133 determines whether the entry selected in step 401 exactly matches the airdate, start time, end time, and program name of an entry in the sales schedule. If yes, method 400 proceeds to step 403; if no, method 400 proceeds to step 404.

In step 403, output review module 133 updates the matching entry in the sales schedule with viewership forecast data associated with the matching entry the research schedule. Method 400 then proceeds back to step 401 for the selection of another episode-level entry in the research schedule.

In step 404, output review module 133 determines whether the entry selected in step 401 exactly matches the airdate, start time, and program name of an entry in the sales schedule. If yes, method 400 proceeds to step 403; if no, method 400 proceeds to step 405.

In step 405, output review module 133 creates an average forecast by price period for the selected entry. The average forecast is based on predicted viewership data included in the research schedule that may be more granular than that included in the sales schedule.

In step 406, output review module 133 determines whether the entry selected in step 401 exactly matches the program name and price period of an entry in the sales schedule. If yes, method 400 proceeds to step 403; if no, method 400 proceeds to step 407.

In step 407, output review module 133 creates an average forecast by quarter for the selected entry. The average forecast is based on predicted viewership data included in the research schedule that may be more granular than that included in the sales schedule.

In step 408, output review module 133 determines whether the entry selected in step 401 exactly matches the program name and quarter of an entry in the sales schedule. If yes, method 400 proceeds to step 403; if no, method 400 proceeds to step 409.

In step 409, output review module 133 determines whether the entry selected in step 401 exactly matches the airdate and the start time of an entry in the sales schedule. If yes, method 400 proceeds to step 403; if no, method 400 proceeds to step 410.

In step 410, output review module 133 determines whether the entry selected in step 401 is the last remaining entry in the research schedule. If yes, method 400 proceeds to step 411 and ends; if no, method 400 proceeds back to step 401 for the selection of another episode-level entry in the research schedule.

By implementation of method 200, 300, and 400, inventory forecasting application 130 facilitates financial planning, content scheduling, and optimization of ratings-based revenue in a media network. In particular, this is due to the episode-level inventory forecasts that can be generated by inventory forecasting application 130 and the sharing of such detailed information between business units of the media network. For example, inventory forecasting application 130 enables input from marketing system 143 to inventory forecasting application 130 to inform a research user to explore the impact that a particular marketing plan, i.e., specific changes to the currently planned programming schedule, can have on viewership, sales, and the like.

Inventory forecasting application 130 also enables the research user to provide a detailed and significantly more accurate inventory forecast to ad sales system 141. As a result, sales system 141 is provided with more detailed (i.e., episode-level) information regarding what inventory (ad time) is available to sell. In addition, the available inventory information received by sales system 141 is more accurate than previously available information, since more sophisticated predictive algorithms are employed in inventory forecasting application 130 than in conventional approaches, and many more data points can be processed by the predictive algorithms. Further, the available inventory information received by sales system 141 is more up-to-date than than that available in conventional approaches, since a detailed viewership forecast can be generated in a largely automated fashion once a programming schedule is received from scheduling module 105. Thus, viewership forecasts can be updated as frequently as needed, and/or in response to relatively small changes in the current programming schedule. By contrast, conventional techniques to generate viewership forecasts are time-consuming and labor intensive, and therefore are generally only updated infrequently, e.g., once or twice per month.

Inventory forecasting application 130 also enables more accurate marketing information to be disseminated earlier to potential viewers, thereby facilitating more effective marketing of media content. For example, specific air dates of new media content can be provided to marketing system 143 sooner, and such specific information can be leveraged by marketing system 143 for more informed advertising purchases. Similarly, inventory forecasting application 130 enables more effective advertising sales by ad sales system 141. For example, changes to the programming schedule for a media network can be provided to ad sales system 141 sooner, for example on a daily basis rather than on a monthly or biweekly basis. Thus, changes to the programming schedule that affect sales can be acted on more quickly, such as cancellations, new programming, and the like.

Figure 5:
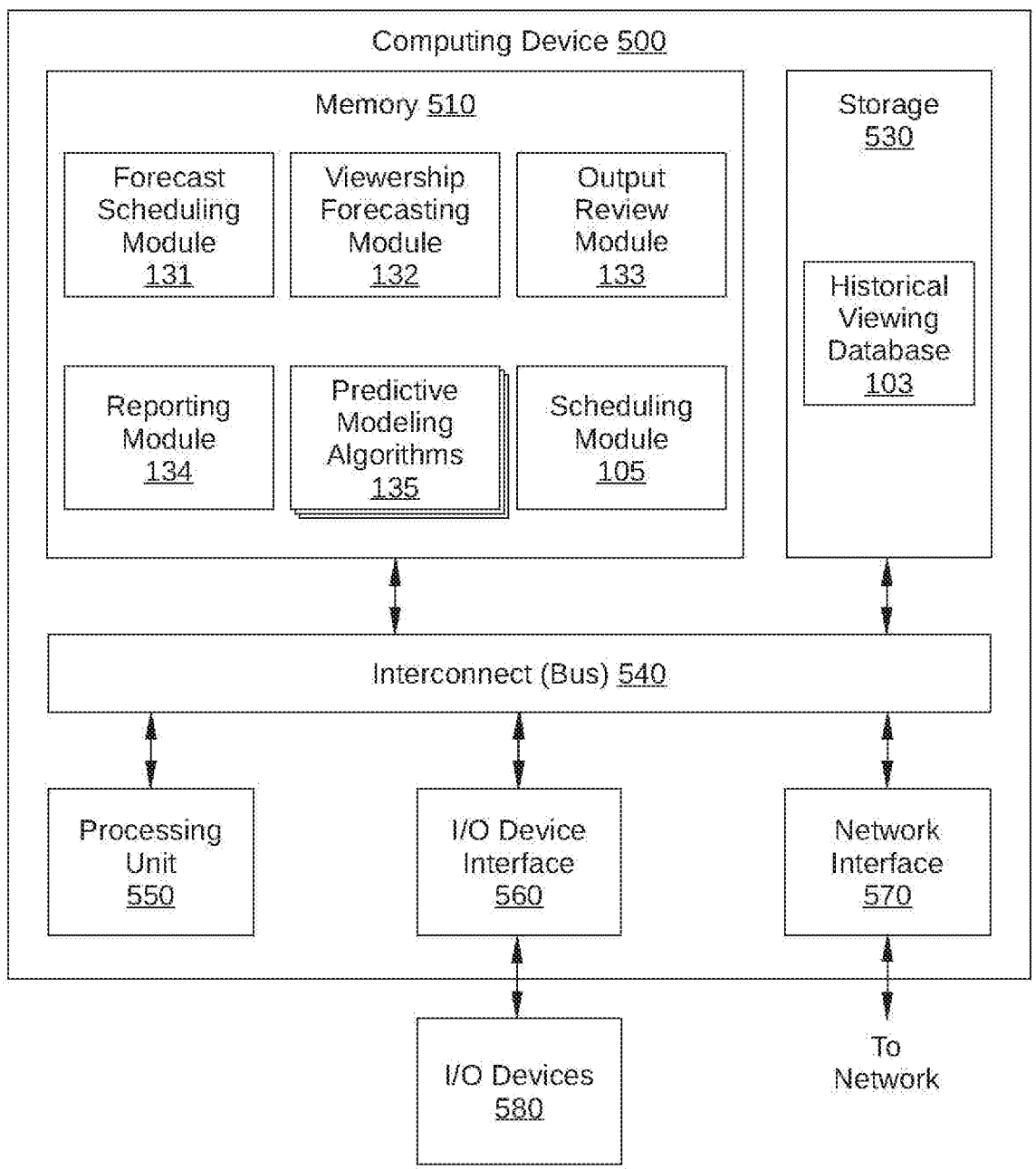
FIG. 5 is an illustration of a computing device, according to various embodiments of the present invention.

Inventory forecasting application 130 generally executes on one or more computing devices. One such computing device is illustrated in FIG. 5. FIG. 5 is an illustration of a computing device 500, according to various embodiments of the present invention. Computing device 500 may be a desktop computer, a laptop computer, a smart phone, electronic tablet or any other type of computing device suitable for practicing one or more embodiments of the present invention. In embodiments in which computing device 500 is a smart phone, electronic tablet, or other web-enabled device, one or more of scheduling module 105, inventory forecasting application 130, forecast scheduling module 131, viewership forecasting module 132, output review module 133, reporting module 134, and/or one or more of predictive modeling algorithms 135 may be accessed through any suitable web browser. In operation, computing device 500 is configured to execute one or more of scheduling module 105, inventory forecasting application 130, forecast scheduling module 131, viewership forecasting module 132, output review module 133, reporting module 134, and/or one or more of predictive modeling algorithms 135, as described herein. It is noted that the computing device described herein is illustrative and that any other technically feasible configurations fall within the scope of the present invention.

As shown, computing device 500 includes, without limitation, an interconnect (bus) 540 that connects a processing unit 550, an input/output (I/O) device interface 560 coupled to input/output (I/O) devices 580, memory 510, a storage 530, and a network interface 570. Processing unit 550 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In general, processing unit 550 may be any technically feasible hardware unit capable of processing data and/or executing software applications, including scheduling module 105, inventory forecasting application 130, forecast scheduling module 131, viewership forecasting module 132, output review module 133, reporting module 134, and/or one or more of predictive modeling algorithms 135. Further, in the context of this disclosure, the computing elements shown in computing device 500 may correspond to a physical computing system (e.g., a system in a data center) or may be a virtual computing instance executing within a computing cloud.

I/O devices 580 may include devices capable of providing input, such as a keyboard, a mouse, a touch-sensitive screen, and so forth, as well as devices capable of providing output. Additionally, I/O devices 580 may include devices capable of both receiving input and providing output, such as a touchscreen, a universal serial bus (USB) port, and so forth. I/O devices 580 may be configured to receive various types of input from an end-user of computing device 500, and to also provide various types of output to the end-user of computing device 500, such as displayed digital images or digital videos. In some embodiments, one or more of I/O devices 580 are configured to couple computing device 500 to a network.

Memory 510 may include a random access memory (RAM) module, a flash memory unit, or any other type of memory unit or combination thereof. Processing unit 550, I/O device interface 560, and network interface 570 are configured to read data from and write data to memory 510. Memory 510 includes various software programs that can be executed by processor 550 and application data associated with said software programs, including scheduling module 105, inventory forecasting application 130, forecast scheduling module 131, viewership forecasting module 132, output review module 133, reporting module 134, and/or one or more of predictive modeling algorithms 135.

In sum, an analytics platform in a media network facilitates information sharing related to modifications to an episode-level programming schedule. An episode-level programming schedule is imported into a viewership forecasting application to generate episode-level ratings predictions. Episode-level ratings predictions for media content in the episode-level programming schedule are generated by implementing multiple different predictive algorithms in parallel for each instance of specific media content in the programming schedule. In addition, for each such predicted viewership value, an accuracy value is generated that indicates the likely accuracy of that predicted viewership value. The episode-level ratings predictions can be uploaded by a business unit of the media network, and merged with a programming schedule currently employed by the business unit.

At least one advantage of the disclosed techniques is that they provide a highly granular inventory forecast for a media network. The detailed viewership predictions included in such an inventory forecast enables more accurate revenue projections and expected viewership predictions for an entire programming schedule or for selected portions thereof. Another advantage is that various users within the media network, including scheduling and researcher users, financial analysts, and marketing or sales personnel can modify the most up-to-date inventory forecast based on various hypothetical changes to optimize future versions of the programming schedule. A further advantage is that a plurality of different predictive modeling algorithms can be employed to generate predicted viewership values for a large number of different instances of media content. Because the accuracy of each algorithm with respect to a particular instance of media content can be estimated based on historical viewership data for that particular instance of media content, for each instance of media content included in an inventory forecast, the output of the most accurate algorithm can be used. Further, the output of the most accurate algorithm can be selected from a large number of possible predictive algorithms, thereby greatly increasing the likelihood of generating an accurate predicted viewership for each instance of media content.

1. In some embodiments, a method for generating a predicted viewership for an instance of media content included in a programming schedule comprises generating, via a first predictive modeling algorithm, a first predicted viewership value for a future showing of a first instance of media content; generating, via the first predictive modeling algorithm, a second predicted viewership value for a past showing of a second instance of media content that shares at least one programming attribute with the first instance of media content; calculating a first accuracy value for the first predicted viewership value based on a comparison of the first predicted viewership value and the second predicted viewership value; generating, via a second predictive modeling algorithm, a third predicted viewership value for the future showing of the first instance of media content; generating, via the second predictive modeling algorithm, a fourth predicted viewership value for a past showing of a third instance of media content that shares at least one programming attribute with the first instance of media content; calculating a second accuracy value for the third predicted viewership value based on a comparison of the third predicted viewership value and the fourth predicted viewership value; and selecting either the first predicted viewership value or the third viewership value as a recommended predicted viewership value for the future showing of the first instance of media content based on the first accuracy value and the second accuracy value.

2. The method of clause 1, wherein generating the first predicted viewership value comprises calculating the first predicted viewership value based on one or more programming attributes of the first instance of media content and on historical viewership data for at least one other instance of media content that shares at least one programming attribute with the first instance of media content.

3. The method of clauses 1 or 2, wherein the first instance of media content is included in a proposed programming schedule that includes a plurality of instances of media content and is received prior to generating the first predicted viewership value.

4. The method of any of clauses 1-3, wherein the first predictive modeling algorithm comprises an average-based model based on historical performance of the first instance of media content, a regression-based algorithm, a time-series-based algorithm, or a machine-learning algorithm.

5. The method of any of clauses 1-4, wherein the first predictive modeling algorithm comprises a regression-based algorithm or a time-series-based algorithm, and generating the first predicted viewership value comprises generating the first predicted viewership value based on statistical attribution data associated with the first instance of media content.

6. The method of any of clauses 1-5, wherein the first predictive modeling algorithm comprises a machine-learning-based algorithm, and generating the first predicted viewership value comprises generating the first predicted viewership value based on historical viewership data for at least one instance of media content that shares two or more programming attributes with the first instance of media content.

7. The method of any of clauses 1-6, further comprising generating, via a third predictive modeling algorithm, a fifth predicted viewership value for the future showing of the first instance of media content; and calculating a third accuracy value for the fifth predicted viewership, wherein selecting either the first predicted viewership value or the third viewership value comprises calculating an average predicted viewership value for the future showing of the first instance of media content based on the first predicted viewership value, the third predicted viewership value, and the fifth predicted viewership value, determining that a difference between the fifth predicted viewership value and the average predicted viewership exceeds a minimum threshold value, and eliminating the fifth predicted viewership value as a possible predicted viewership value for the future showing of the first instance of media content.

8. The method of any of clauses 1-7, further comprising, prior to selecting either the first predicted viewership value or the third viewership value determining that a third predictive modeling algorithm is excluded for use with the first instance of media content based on predetermined logic indicating that the third predictive modeling algorithm is not to be employed for the first instance of media content.

9. The method of any of clauses 1-8, wherein the predetermined logic determines that the third predictive modeling algorithm is not to be employed for the first instance of media content based on a programming attribute of the first instance of media content.

10. In some embodiments, a non-transitory computer-readable storage medium including instructions that, when executed by a processor, cause the processor to perform the steps of generating, via a first predictive modeling algorithm, a first predicted viewership value for a future showing of a first instance of media content; generating, via the first predictive modeling algorithm, a second predicted viewership value for a past showing of a second instance of media content that shares at least one programming attribute with the first instance of media content; calculating a first accuracy value for the first predicted viewership value based on a comparison of the first predicted viewership value and the second predicted viewership value; generating, via a second predictive modeling algorithm, a third predicted viewership value for the future showing of the first instance of media content; generating, via the second predictive modeling algorithm, a fourth predicted viewership value for a past showing of a third instance of media content that shares at least one programming attribute with the first instance of media content; calculating a second accuracy value for the third predicted viewership value based on a comparison of the third predicted viewership value and the fourth predicted viewership value; and selecting either the first predicted viewership value or the third viewership value as a recommended predicted viewership value for the future showing of the first instance of media content based on the first accuracy value and the second accuracy value.

11. The non-transitory computer-readable storage medium of clause 10, wherein generating the first predicted viewership value comprises calculating the first predicted viewership value based on one or more programming attributes of the first instance of media content and on historical viewership data for at least one other instance of media content that shares at least one programming attribute with the first instance of media content.

12. The non-transitory computer-readable storage medium of clauses 10-11, wherein the first instance of media content is included in a proposed programming schedule that includes a plurality of instances of media content and is received prior to generating the first predicted viewership value.

13. The non-transitory computer-readable storage medium of any of clauses 10-12, wherein the at least one programming attribute includes one or more of a media content genre type, a media content target demographic, a lead-in genre type for the media content, a subsequently aired media content genre type, a media content seasonality, a media content air time, a media content repeat or original broadcast status, and a media content guest star status.

14. The non-transitory computer-readable storage medium of any of clauses 10-13, wherein the first predictive modeling algorithm comprises an average-based model based on historical performance of the first instance of media content, a regression-based algorithm, a time-series-based algorithm, or a machine-learning algorithm.

15. The non-transitory computer-readable storage medium of any of clauses 10-14, wherein the average-based model includes a year-over-year decline calculation for instances of media content that have aired for more than one year.

16. The non-transitory computer-readable storage medium of any of clauses 10-15, wherein the average-based model includes a calculation for a new season average of a particular instance of media content that is based on actual viewership of the N most recently aired episodes of the particular instance of media content.

17. The non-transitory computer-readable storage medium of any of clauses 10-16, wherein calculation for the new season average of the particular instance of media content is further based on a seasonal trend factor derived from the N most recently aired episodes.

18. The non-transitory computer-readable storage medium of any of clauses 10-17, wherein the first predictive modeling algorithm comprises a regression-based algorithm or a time-series-based algorithm, and generating the first predicted viewership value comprises generating the first predicted viewership value based on statistical attribution data associated with the first instance of media content.

19. In some embodiments, a computing device comprises a memory that stores instructions; and a processor that is coupled to the memory and, when executing the instructions, is configured to perform the steps of generating, via a first predictive modeling algorithm, a first predicted viewership value for a future showing of a first instance of media content; generating, via the first predictive modeling algorithm, a second predicted viewership value for a past showing of a second instance of media content that shares at least one programming attribute with the first instance of media content; calculating a first accuracy value for the first predicted viewership value based on a comparison of the first predicted viewership value and the second predicted viewership value; generating, via a second predictive modeling algorithm, a third predicted viewership value for the future showing of the first instance of media content; generating, via the second predictive modeling algorithm, a fourth predicted viewership value for a past showing of a third instance of media content that shares at least one programming attribute with the first instance of media content; calculating a second accuracy value for the third predicted viewership value based on a comparison of the third predicted viewership value and the fourth predicted viewership value; and selecting either the first predicted viewership value or the third viewership value as a recommended predicted viewership value for the future showing of the first instance of media content based on the first accuracy value and the second accuracy value.

20. The computing device of clause 19, wherein generating the first predicted viewership value comprises calculating the first predicted viewership value based on one or more programming attributes of the first instance of media content and on historical viewership data for at least one other instance of media content that shares at least one programming attribute with the first instance of media content.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

We claim:

1. A method for scheduling an instance of media content, the method comprising:
   generating, via a first predictive modeling algorithm, a first predicted viewership value for a future showing of a first instance of media content;
   receiving one or more second predicted viewership values previously generated via the first predictive modeling algorithm for the first instance of media content shown at one or more historical times;
   determining a different media content that shares at least one shared programming attribute with the first instance of media content;
   receiving historical viewership data for one or more broadcast instances of the different media content;
   calculating a first accuracy value for the first predicted viewership value based on a comparison of the one or more second predicted viewership values with the historical viewership data for the one or more broadcast instances of the different media content;
   generating, via a second predictive modeling algorithm, a third predicted viewership value for the future showing of the first instance of media content, wherein the second predictive modeling algorithm comprises a machine-learning-based algorithm;
   receiving one or more fourth predicted viewership values previously generated via the second predictive modeling algorithm for the first instance of media content shown at the one or more historical times;
   calculating a second accuracy value for the third predicted viewership value based on a comparison of the one or more fourth predicted viewership values with the historical viewership data for the one or more broadcast instances of the different media content;
   selecting either the first predicted viewership value or the third predicted viewership value as a recommended predicted viewership value for the future showing of the first instance of media content based on a comparison of the first accuracy value and the second accuracy value; and
   setting at least one time to show the first instance of media content based on the recommended predicted viewership value.

2. The method of claim 1, wherein generating the first predicted viewership value comprises calculating the first predicted viewership value based on one or more programming attributes of the first instance of media content and on the historical viewership data for the one or more broadcast instances of the different media content.

3. The method of claim 1, wherein the first instance of media content is included in a proposed programming schedule that includes a plurality of instances of the media content and is received prior to generating the first predicted viewership value.

4. The method of claim 1, wherein the first predictive modeling algorithm comprises an average-based algorithm, a regression-based algorithm, or a time-series-based algorithm.

5. The method of claim 1, wherein generating the third predicted viewership value comprises generating the third predicted viewership value based on the historical viewership data for the one or more broadcast instances of the different media content.

6. The method of claim 1, further comprising:
   generating, via a third predictive modeling algorithm, a fifth predicted viewership value for the future showing of the first instance of media content; and
   calculating a third accuracy value for the fifth predicted viewership value,
   wherein selecting either the first predicted viewership value or the third predicted viewership value comprises:
      calculating an average predicted viewership value for the future showing of the first instance of media content based on the first predicted viewership value, the third predicted viewership value, and the fifth predicted viewership value,
      determining that a difference between the fifth predicted viewership value and the average predicted viewership value exceeds a minimum threshold value, and
      eliminating the fifth predicted viewership value as a possible predicted viewership value for the future showing of the first instance of media content.

7. The method of claim 1, further comprising, prior to selecting either the first predicted viewership value or the third predicted viewership value as the recommended predicted viewership value, determining that a third predictive modeling algorithm is excluded for use with the first instance of media content based on predetermined logic indicating that the third predictive modeling algorithm is not to be employed for the first instance of media content.

8. The method of claim 7, wherein the predetermined logic determines that the third predictive modeling algorithm is not to be employed for the first instance of media content based on a programming attribute of the first instance of media content.

9. A non-transitory computer-readable storage medium including instructions that, when executed by a processor included in a computing device, cause the processor to perform the steps of:
   generating, via a first predictive modeling algorithm, a first predicted viewership value for a future showing of a first instance of media content;
   receiving one or more second predicted viewership values previously generated via the first predictive modeling algorithm for the first instance of media content shown at one or more historical times;
   determining a different media content that shares at least one shared programming attribute with the first instance of media content;
   receiving historical viewership data for one or more broadcast instances of the different media content;
   calculating a first accuracy value for the first predicted viewership value based on a comparison of the one or more second predicted viewership values with the historical viewership data for the one or more broadcast instances of the different media content;
   generating, via a second predictive modeling algorithm, a third predicted viewership value for the future showing of the first instance of media content, wherein the second predictive modeling algorithm comprises a machine-learning-based algorithm;
   receiving one or more fourth predicted viewership values previously generated via the second predictive modeling algorithm for the first instance of media content shown at the one or more historical times;
   calculating a second accuracy value for the third predicted viewership value based on a comparison of the one or more fourth predicted viewership values with the historical viewership data for the one or more broadcast instances of the different media content;
   selecting either the first predicted viewership value or the third predicted viewership value as a recommended predicted viewership value for the future showing of the first instance of media content based on a comparison of the first accuracy value and the second accuracy value; and setting at least one time to show the first instance of media content based on the recommended predicted viewership value.

10. The non-transitory computer-readable storage medium of claim 9, wherein generating the first predicted viewership value comprises calculating the first predicted viewership value based on one or more programming attributes of the first instance of media content and on the historical viewership data for the one or more broadcast instances of the different media content.

11. The non-transitory computer-readable storage medium of claim 9, wherein the first instance of media content is included in a proposed programming schedule that includes a plurality of instances of media content and is received prior to generating the first predicted viewership value.

12. The non-transitory computer-readable storage medium of claim 10, wherein the at least one shared programming attribute includes one or more of a media content genre type, a media content target demographic, a lead-in genre type, a subsequently aired media content genre type, a media content seasonality, a media content air time, a media content repeat or original broadcast status, or a media content guest star status.

13. The non-transitory computer-readable storage medium of claim 9, wherein the first predictive modeling algorithm comprises an average-based algorithm, a regression-based algorithm, or a time-series-based algorithm.

14. The non-transitory computer-readable storage medium of claim 13, wherein the first predictive modeling algorithm comprises the average-based algorithm, and the average-based algorithm includes 1) a calculation for a new season average of the first instance of media content that is based on actual viewership of N most recently aired episodes of the media content, or 2) a year-over-year decline calculation for instances of media content that were aired more than one year ago.

15. The non-transitory computer-readable storage medium of claim 14, wherein the average-based algorithm includes the calculation for the new season average of the first instance of media content, and the calculation for the new season average of the first instance of media content is further based on a seasonal trend factor derived from the N most recently aired episodes.

16. The non-transitory computer-readable storage medium of claim 9, wherein generating the first predicted viewership value comprises generating the first predicted viewership value based on statistical attribution data associated with the first instance of media content.

17. A computing device, the computing device comprising:
a memory that stores instructions; and
a processor that is coupled to the memory and, when executing the instructions, performs the steps of:
generating, via a first predictive modeling algorithm, a first predicted viewership value for a future showing of a first instance of media content,
receiving one or more second predicted viewership values previously generated via the first predictive modeling algorithm for the first instance of media content shown at one or more historical times,
determining a different media content that shares at least one shared programming attribute with the first instance of media content,
receiving historical viewership data for one or more broadcast instances of the different media content,
calculating a first accuracy value for the first predicted viewership value based on a comparison of the one or more second predicted viewership values with the historical viewership data for the one or more broadcast instances of the different media content,
generating, via a second predictive modeling algorithm, a third predicted viewership value for the future showing of the first instance of media content, wherein the second predictive modeling algorithm comprises a machine-learning-based algorithm,
receiving one or more fourth predicted viewership values previously generated via the second predictive modeling algorithm for the first instance of media content shown at the one or more historical times,
calculating a second accuracy value for the third predicted viewership value based on a comparison of the one or more fourth predicted viewership values with the historical viewership data for the one or more broadcast instances of the different media content,
selecting either the first predicted viewership value or the third predicted viewership value as a recommended predicted viewership value for the future showing of the first instance of media content based on a comparison of the first accuracy value and the second accuracy value, and
setting at least one time to show the first instance of media content based on the recommended predicted viewership value.

18. The computing device of claim 17, wherein generating the first predicted viewership value comprises calculating the first predicted viewership value based on one or more programming attributes of the first instance of media content and on the historical viewership data for the one or more broadcast instances of the different media content.

19. The method of claim 1, wherein the one or more broadcast instances of the different media content comprises one or more show episodes prior to the first instance of media content.

20. The non-transitory computer-readable storage medium of claim 9, wherein the one or more broadcast instances of the different media content comprises one or more show episodes prior to the first instance of media content.

21. The method of claim 1, wherein the at least one shared programming attribute includes an airing time slot of a programming schedule, the one or more broadcast instances of the different media content occurred during an airing time slot of a historical programming schedule, and the future showing of the first instance of the media content is during an airing time slot of a future programming schedule.

* * * * *